United States Patent
Prost et al.

(10) Patent No.: US 11,098,674 B2
(45) Date of Patent: Aug. 24, 2021

(54) PISTON FOR A HEAT ENGINE, HEAT ENGINE COMPRISING SUCH A PISTON, AND METHODS

(71) Applicant: H.E.F., Andrezieux Boutheon (FR)

(72) Inventors: Fabrice Prost, Saint-Etienne (FR); Christophe Heau, Saint-Etienne (FR); Romain Montelimard, Saint-Galmier (FR)

(73) Assignee: H.E.F., Andrezieux Boutheon (FR)

( * ) Notice: Subject to any disclaimer, the term of this patent is extended or adjusted under 35 U.S.C. 154(b) by 195 days.

(21) Appl. No.: 16/477,232

(22) PCT Filed: Jan. 10, 2018

(86) PCT No.: PCT/FR2018/050052
§ 371 (c)(1),
(2) Date: Jul. 11, 2019

(87) PCT Pub. No.: WO2018/130779
PCT Pub. Date: Jul. 19, 2018

(65) Prior Publication Data
US 2021/0123395 A1    Apr. 29, 2021

(30) Foreign Application Priority Data

Jan. 11, 2017  (FR) ...................................... 1750238

(51) Int. Cl.
*F02F 3/00* (2006.01)
*F16J 1/02* (2006.01)
*F16J 9/00* (2006.01)

(52) U.S. Cl.
CPC .............. *F02F 3/0084* (2013.01); *F16J 1/02* (2013.01); *F16J 9/00* (2013.01)

(58) Field of Classification Search
CPC ................ F02F 3/0084; F16J 9/00; F16J 1/02
See application file for complete search history.

(56) References Cited

U.S. PATENT DOCUMENTS

| | | | | |
|---|---|---|---|---|
| 1,667,548 A | * | 4/1928 | Hanch ........................ | F16J 9/20 92/158 |
| 2014/0083390 A1 | * | 3/2014 | Azevedo .................. | F16J 1/005 123/193.6 |

(Continued)

FOREIGN PATENT DOCUMENTS

| | | | | |
|---|---|---|---|---|
| DE | 4113773 | | 1/1992 | |
| DE | 4113773 A1 | * | 1/1992 | ................ F16J 1/02 |

(Continued)

OTHER PUBLICATIONS

International Search Report (English) and Written Opinion dated Apr. 9, 2018, from International Application No. PCT/FR2018/050052, 16 pages.

*Primary Examiner* — Jacob M Amick
*Assistant Examiner* — Charles J Brauch
(74) *Attorney, Agent, or Firm* — Meunier Carlin & Curfman LLC (57) ABSTRACT

Various implementations include a combustion engine piston, including a skirt in a counter-part and including a first contact area of the piston in the counter-part, a head which extends transverse to a central axis, and a ring carrier which comprises at least two lands and at least two grooves for receiving the rings, including a first land adjoining the head and a second land situated between the first land and the skirt, wherein the lands include at least one contact land having a diameter greater than a minimum diameter of the skirt to form a second contact area of the piston in the counter-part, and wherein at least one contact land comprises a friction-reducing surface coating, formed at least on a radial sector covering an angle of at least 30 degrees, and up to on a single sector covering an angle of 360 degrees.

18 Claims, 5 Drawing Sheets

(56) References Cited

U.S. PATENT DOCUMENTS

| | | |
|---|---|---|
| 2014/0087190 A1 | 3/2014 | Heau et al. |
| 2016/0369736 A1 | 12/2016 | Heau et al. |

FOREIGN PATENT DOCUMENTS

| | | | |
|---|---|---|---|
| EP | 3061960 | 8/2016 | |
| WO | 94/23193 | 10/1994 | |
| WO | WO-9423193 A1 * | 10/1994 | ................ F16J 1/02 |
| WO | 2012/156647 | 11/2012 | |
| WO | 2013/164690 | 11/2013 | |
| WO | WO-2016174246 A1 * | 11/2016 | .............. F01B 17/04 |

* cited by examiner

PISTON FOR A HEAT ENGINE, HEAT ENGINE COMPRISING SUCH A PISTON, AND METHODS

TECHNICAL FIELD OF THE INVENTION

The present invention relates to a piston for a heat engine, in particular for a heat engine with alternating movement and internal combustion. The invention also relates to a heat engine comprising such a piston. The invention also relates to a method for coating such a piston. The invention lastly relates to a method for implementing such a heat engine.

The field of the invention is that of pistons for heat engines, in particular heat engines with alternating movement and internal combustion.

BACKGROUND OF THE INVENTION

In a known manner, such a piston comprises a skirt, a head and a ring carrier. Within the engine, the piston is driven in an alternating translational movement in the jacket of the cylinder block. The skirt is provided to guide the piston in the jacket. The head is provided to be arranged in contact with the combustion gases, and to receive the forces due to said combustion. The ring carrier is located between the skirt and the head. The ring carrier comprises alternating lands and grooves, which are provided to receive rings.

The current measuring cycles of vehicle pollution/consumption, such as the NEDC ("New European Driving Cycle"), have caused a trend toward engine downsizing. The new engines have a smaller cubic inch displacement, while developing as much power.

By 2017, the new WLTP ("Worldwide Harmonized Light Vehicles Test Procedure") will favor high-power engines.

Thus, this results in an increased iso-displacement power, and therefore an increase in thermal and mechanical stresses within the combustion chambers. The result is the gradual replacement of the pistons, which today are primarily made from aluminum alloy for light vehicles, by steel pistons.

In order to limit the impact of this change on the weight of the pistons as much as possible, their geometry is modified, leading to short pistons. This change in geometry causes a change of the piston/jacket contact, and therefore of the bearing zones (contact and friction).

For vehicles equipped with aluminum pistons, the piston/sleeve contact is optimized by depositing a graphite coating on the skirt.

For large-series light vehicles equipped with steel pistons, the coated zone is also preferably the skirt. However, it appears increasingly important to reconsider the bearing zones of the piston on the sleeve during its alternating movement, which would tend to decrease the play at the lands of the piston.

Furthermore, the steel pistons are primarily used in the engines of industrial vehicles, due to the fact that combustion pressures can reach 250 bars. In recent years, there have not been major changes to the piston/sleeve contact in these engines.

DE 41 13 773 and DE 43 10 491 disclose pistons illustrating the state of the art, provided with contact lands whereof the diameter is equal to the diameter of the skirt.

In DE 41 13 773, the contact lands include a coating of variable thickness around the central axis.

In DE 43 10 491, the contact lands include a thick layer of synthetic resin. For example, this synthetic resin is made from polyamide, incorporating graphite and metallic particles. The layer of resin has a thickness of between 15 and 25 μm.

These pistons are not fully satisfactory, in terms of reducing wear and the risk of seizing.

SUMMARY OF THE INVENTION

The aim of the present invention is to propose an improved piston, taking the above context into account.

For this purpose, the subject of the invention is a heat engine piston, comprising:
- a skirt for guiding the piston in translation along a central axis in a counter-part and consisting of a first contact area of the piston in the counter-part,
- a head which extends transverse to the central axis and is intended to be arranged in contact with the combustion gases, and
- a ring carrier which comprises at least two lands and at least two grooves intended for receiving the rings, including a first land adjoining the head and a second land situated between the first land and the skirt,
- characterized in that the lands include at least one contact land having a diameter greater than a minimum diameter of the skirt in order to form a second contact area of the piston in the counter-part,
- and in that at least one contact land comprises a friction-reducing surface coating, formed at least on a radial sector covering an angle of at least 30 degrees, and up to on a single sector covering an angle of 360 degrees.

The applicant has observed that in the new moving parts concepts, at least one of the lands of the ring carrier can become a contact and friction zone with the sleeve. Such friction causes an increase in fuel consumption and therefore $CO_2$ emissions.

In this context, the invention makes it possible to optimize the piston/sleeve contact within the engine. By providing a contact land of greater diameter, the invention makes it possible to define a privileged contact area at the ring carrier, complementary to the contact area defined at the skirt. By applying a surface coating at least on this contact land, the invention makes it possible to reduce the friction coefficient between the two parts in contact and in motion relative to one another. Furthermore, the invention makes it possible to greatly reduce the wear and/or the risk of seizing.

In the context of the invention, the diameter of the contact lands is considered without the coating, while the diameter of the skirt is considered without the bores and recesses.

According to other advantageous features of the invention, considered alone or in combination:
- The at least one contact land has a diameter larger than an average diameter of the skirt.
- The piston is a short piston, having a height smaller than the diameter thereof.
- The base material of the piston is steel. In other words, the skirt, the head and the ring carrier of the piston are made from steel. Preferably, this steel is a forged steel.
- The friction-reducing surface coating is made from amorphous carbon of the DLC ("diamond-like carbon") type a-C:H or ta-C.
- The at least one contact land includes at least one sublayer formed below the friction-reducing surface coating.
- The at least one contact land lacks at least one sublayer formed below the friction-reducing surface coating.
- The second land has a diameter larger than the first land.
- Among the lands of the ring carrier, only the contact land(s) include a friction-reducing surface coating.

The ring carrier comprises two contact lands.

The two contact lands are the second land and a third land.

The two contact lands are the first land and the second land.

The friction-reducing surface coating is formed on a single radial sector covering an angle of at least 30 degrees.

The friction-reducing surface coating is formed over two diametrically opposite radial sectors relative to the central axis and each covering an angle of at least 30 degrees.

The or each radial sector covers an angle limited to 30 degrees.

The or each radial sector covers an angle limited to 45 degrees.

The or each radial sector covers an angle limited to 60 degrees.

The or each radial sector covers an angle limited to 90 degrees.

The or each radial sector covers an angle limited to 120 degrees.

The friction-reducing surface coating is formed over 360 degrees around the central axis.

The friction-reducing surface coating has a maximum roughness Rz less than or equal to 2 µm, preferably less than or equal to 0.5 µm, for example obtained by polishing or sanding.

The friction-reducing surface coating has a thickness, defined radially to the central axis, of between 1 and 5 µm, preferably between 2 and 3 µm.

The friction-reducing surface coating has a thickness less than or equal to 10 µm.

The first land lacks coating.

The grooves lack coating.

The invention also relates to a heat engine, comprising a piston as described above, and a counter-part receiving the piston.

For example, the counter-part can be made from steel, stainless steel, cast iron, aluminum alloy, etc.

Preferably, the counter-part includes a friction-reducing surface coating made from amorphous carbon of the DLC type.

When the heat engine is a motor, the counterpart is a sleeve.

The sleeve can be a dry sleeve, secured to a casing of the cylinder block.

Alternatively, the sleeve can be a wet sleeve, removable relative to the casing of the cylinder block, with a coolant inserted between the sleeve and the casing.

Preferably, the sleeve includes a friction-reducing surface coating to reduce the wear and/or the risk of seizing. Still more preferably, this coating is made from amorphous carbon of the DLC type. As a non-limiting example, the sleeve and the coating thereof can be according to the teachings of document WO2013/164690.

The object of the invention is also a method for coating a piston such as that described above. The method is characterized in that it comprises the following steps:
   a step for positioning a mask on the ring carrier, and
   a step for localized deposition of a friction-reducing surface coating through the mask, at least on the at least one contact land.

The object of the invention is also a method for implementing a heat engine as described above, characterized in that the skirt and the at least one contact land including the friction-reducing surface coating form the contact areas of the piston in the counter-part.

BRIEF DESCRIPTION OF THE DRAWINGS

The invention will be better understood upon reading the following description, given solely as a non-limiting example, and made with reference to the accompanying figures wherein.

DETAILED DESCRIPTION OF SOME EMBODIMENTS

Figure 1:
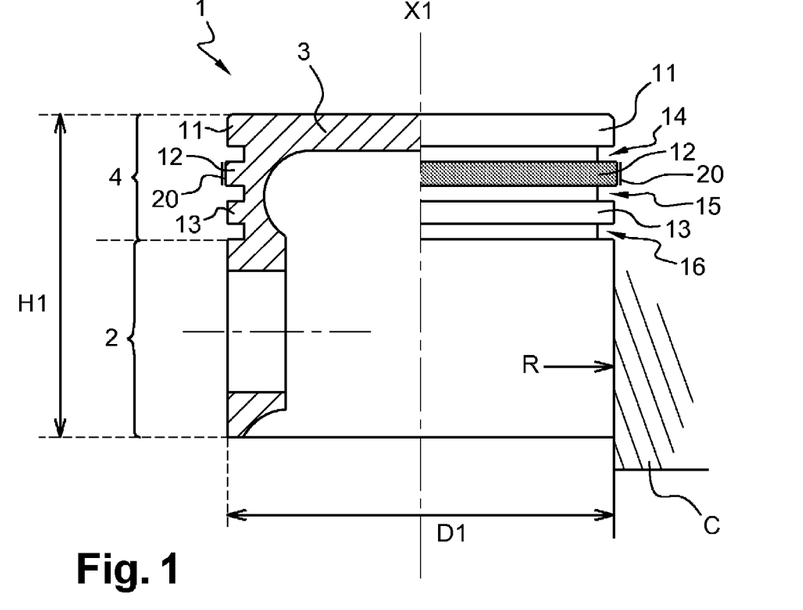
FIG. 1 is a side view, in partial cross-section, of a piston according to the invention, of the short piston type, where the second land constitutes a contact land including a surface coating.
Figure 2:
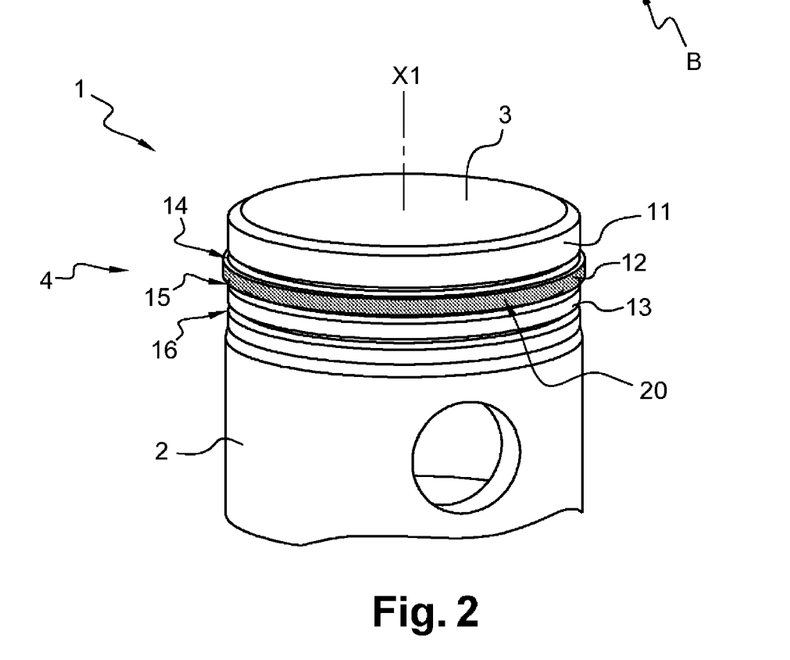
FIG. 2 is a perspective view of the piston of FIG. 1.
Figure 3:
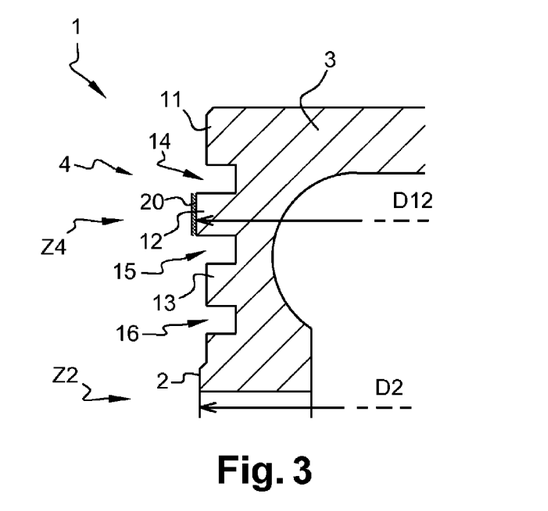
FIG. 3 is an enlarged partial cross-section of the ring carrier, showing the second land having a diameter larger than the skirt, as well as the first and third land.

FIGS. 1 to 3 show a piston 1 according to the invention.

The piston 1 is provided to equip a heat engine, more specifically an engine with alternating movement and internal combustion. The piston 1 is arranged in a sleeve C of a cylinder block B, partially shown only in FIG. 1 for simplification purposes. Preferably, the sleeve C includes a friction-reducing surface coating R made from amorphous carbon of the DLC type.

The piston 1 is made from metal, preferably steel, aluminum alloy, or formed by an assembly of parts made from different metallic materials.

The piston 1 has a longitudinal central axis X1, a height H1 defined parallel to the axis X1 and a diameter D1 defined radially to the axis X1. The piston 1 is a short piston, having a height H1 smaller than its diameter D1.

The piston 1 comprises a skirt 2, a head 3 and a ring carrier 4. The piston 1 is provided to receive rings, not shown for simplification reasons.

Within the engine, the piston 1 is driven in an alternating translational movement along the axis X1 in the counter-part formed by the sleeve C.

More specifically, the piston 1 moves in the sleeve C according to a main translational movement along the axis X1, and secondary movements that can be summarized by a lateral movement perpendicular to the axis X1 and a rotational movement around an axis perpendicular to the axis X1 (tilting movement).

This results in guiding of the piston 1 in the sleeve C owing to a contact between its skirt 2 and the sleeve C, contact that can be more pronounced between the sleeve C and the lower end of the skirt 2. The tilting movement and the deformations of the skirt 3 also cause contact between the sleeve C and the head 3 and/or the ring carrier 4 of the piston 1 on the tilting side.

The skirt 2 is made up of an overall tubular wall centered on the axis X1, having an outer diameter D2. The skirt 2 is provided to guide the piston 1 in the sleeve C, and makes up a first contact area Z2 of the piston 1 in the sleeve C. The skirt 2 preferably includes a friction-reducing surface coating.

Preferably, the coating of the skirt 2 is made from amorphous carbon of the DLC type.

Alternatively, the coating of the skirt 2 can be made from graphite or any other material suitable for the targeted application.

The head 3 is made up by a wall that extends transversely to the axis X1. The head 3 is provided to be arranged in contact with the combustion gases, and to receive the forces due to said combustion.

In the example of the figures, the head 3 is made up of a planar wall. Alternatively, the head 3 can be made up of a hollow wall, including a blind cavity open on the outer side.

The ring carrier 4 is located between the skirt 2 and the head 3. The ring carrier 4 comprises three lands 11, 12 and 13, as well as three grooves 14, 15 and 16 provided to receive rings. Each land 11, 12 and 13 is made up of a cylindrical surface. Each groove 14, 15 and 16 is made up of a cylindrical surface withdrawn relative to the adjacent lands, as well as two annular planar surfaces connected to the adjacent lands.

The first land 11 is located in the immediate vicinity of the head 3, in contact with the gases and the fire.

The second land 12 is located in the intermediate part of the ring carrier 4 between the skirt 2 and the head 3, while being slightly closer to the head 3.

The third land 13 is located close to the skirt 2.

The groove 14 is located between the lands 11 and 12. The groove 14 is provided to receive the fire ring, in contact with the gases and the fire.

The groove 15 is located between the lands 12 and 13. The groove 15 is provided to receive the sealing ring, providing total sealing of the gases, while blocking those that would have passed the fire ring.

The groove 16 is located between the land 13 and the skirt 2. The groove 16 is provided to receive the scraping ring, providing the scraping of the lubricant on the surface of the sleeve C.

In the new moving parts concepts, the ring carrier 4 is able to become a second contact area Z4 of the piston 1 in the sleeve C, in other words a second contact and friction area of the piston 1 with the sleeve C.

In the embodiment of the invention illustrated in FIGS. 1 to 3, the land 12 has a diameter D12 greater than a minimum diameter D2 of the skirt 2. Thus, the land 12 is a contact land making up the second contact area Z4 of the piston 1 in the sleeve C, in addition to the first contact area Z2 formed by the skirt 2. Preferably, the diameter D12 is greater than the average diameter D2 of the skirt 2, which can deform during operation. For example, the diameter D12 can be 10 to 50 μm larger than the diameter D2.

Furthermore, the land 12 includes a friction-reducing surface coating 20, formed on a sector covering an angle of 360 degrees around the axis X1. In other words, the coating 20 is deposited on the entire circumference of the land 12. The coating 20 makes it possible to reduce the friction coefficient between the land 12 and the sleeve C, in contact and in motion relative to one another. Furthermore, the coating 20 makes it possible to greatly reduce the wear and/or the risk of seizing.

As shown in FIG. 3, the diameter D12 of the land 12 is considered without the coating 20. In turn, the diameter D2 of the skirt 2 is considered without the bores and recesses.

More generally, in the context of the invention, the piston 1 comprises at least one contact land having a diameter larger than the minimum outer diameter of the skirt and including a friction-reducing coating formed at least over a radial sector covering an angle of at least 30 degrees, and up to over a single sector covering an angle of 360 degrees. In other words, the coating extends around the axis X1 at least over a radial sector of 30 degrees, at most over a sector of 360 degrees, and can extend over several radial sectors each covering an angle of at least 30 degrees.

In the embodiment of FIGS. 1 to 3, the coating 20 is formed only on the surface of the land 12, without overflowing in the adjacent grooves 14 and 15. Indeed, for some applications and/or for some materials, the coating 20 present in the grooves could be subject to a pulling-out phenomenon, generating pollution in contact between the ring carriers 4 and the sleeve C.

Alternatively, the coating 20 can be formed on the surface of the land 12 and in the adjacent grooves 14 and 15. In this case, the deposition of the coating 20 is simplified.

Furthermore, the coating 20 is formed over the entire height of the land 12, defined parallel to the axis X1.

Alternatively, the coating 20 can be formed only over a portion of the height of the land 12, in particular in its center. This makes it possible to avoid any overflow of the coating 20 in the grooves 14 and 15 during its deposition on the land 12.

The coating 20 has a maximum roughness Rz less than or equal to 2 μm, preferably less than or equal to 0.5 μm, for example obtained by polishing or sanding.

The coating 20 has a thickness, defined radially to the axis X1, preferably equal to 2 μm. Alternatively, said thickness can be between 1 and 5 μm, preferably between 2 and 3 μm. The thickness of the coating 20 can in particular vary as a function of the diameter D1. For example, in the case where the piston 1 equips a heavy vehicle engine, it is conceivable for this thickness to reach up to 10 μm. Preferably, the coating 20 has a constant thickness, defined radially to the axis X1.

In practice, in the contact area Z4, the land 12 can rub against the sleeve C over a single radial sector, and not over its entire circumference. Thus, it is sufficient to deposit the coating 20 on a single radial sector covering an angle of at least 30 degrees.

Alternatively, in the contact area Z4, the land 12 can rub against the sleeve C in two diametrically opposite portions. In this case, it is sufficient to deposit the coating 20 on two diametrically opposite radial sectors of the land 12, each covering an angle of at least 30 degrees.

According to other alternatives, the coating 20 can be deposited on one or two radial sectors of the land 12, each covering an angle limited to 45, 60, 90 or 120 degrees, around the axis X1.

The coating 20 has a friction coefficient lower than the constituent material of the ring carrier 4. Thus, the friction between the sleeve C and the land 12 provided with the coating 20 is reduced, compared with the land 12 lacking coating 20.

Preferably, the coating 20 is made from amorphous carbon of the DLC type. In other words, the coating 20 is a layer of hybridized carbon in $sp^2$ or $sp^a$, with or without hydrogen.

For example, the coating 20 can be made from ta-C, a-C:H or ta-C:H. Also preferably, the coating 20 is made from a-C:H.

Alternatively, the coating 20 can be made from graphite or any other material suitable for the targeted application. Preferably, the coating 20 is homogeneous.

Figure 4:
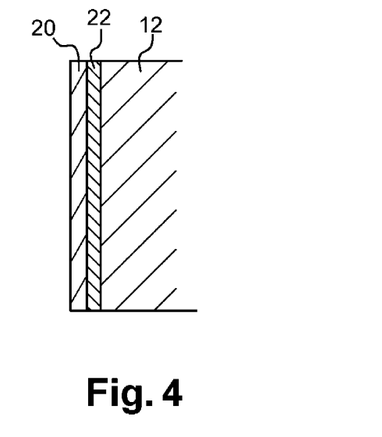
FIG. 4 is an enlarged partial cross-section of the second land, shown in a variant in which the second land includes a sublayer formed below the surface coating.

In FIG. 4, the second land 12 includes a sublayer 22 formed below the surface coating 20. For example, said sublayer 22 includes a Cr and/or W and/or Ni base.

Figure 5:
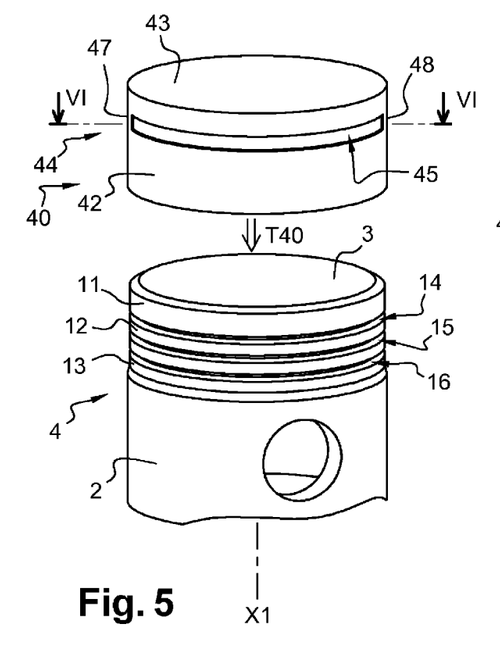
FIG. 5 is a perspective view showing a mask provided to cover the piston during the deposition of the surface coating.
Figure 6:
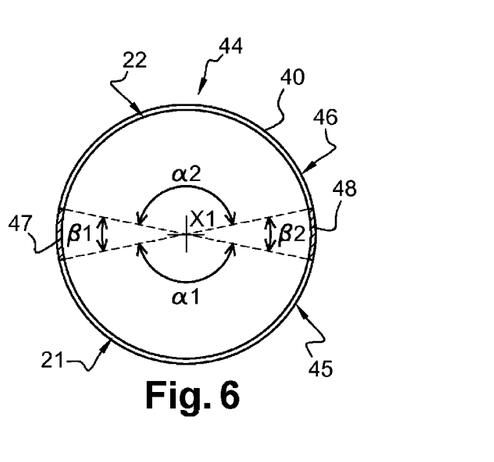
FIG. 6 is a cross-section of the mask in the transverse plane defined by line VI-VI in FIG. 5.

FIGS. 5 and 6 show an example coating method of a piston 1 according to the invention, aiming to deposit the coating 20 on the land 12.

The method comprises at least one step for positioning a mask 40 on the piston 1, then a step for depositing the coating 20 on the land 12 through the mask 40. The method may include other steps within the scope of the invention.

The mask 40 is positioned on the piston 1 according to a translational movement T40 oriented along the axis X1, as illustrated by an arrow in FIG. 5. The mask 40 then covers at least part of the piston 1, during the deposition of the coating 20.

The mask 40 comprises a tubular part 42 and a planar part 43. When the mask 40 is positioned on the piston 1, the part 42 covers the ring carrier 4, while the part 43 covers the head 3.

In the planar part 42, an intermediate portion 44 comprises two diametrically opposite slits 45 and 46, as well as two diametrically opposite junction zones 47 and 48. The slits 45 and 46 formed through the mask 40 allow the deposition of the coating 20 on the land 12. The areas 47 and 48 make it possible to connect the parts 42 and 43.

As shown in FIG. 6, when the mask 40 is positioned on the piston 1, the slit 45 defines a sector with angle α1 corresponding to the radial sector 21 of the coating 20, the slit 46 defines a sector with angle α2 corresponding to the radial sector 22 of the coating 20, the area 47 defines a sector with angle θ1 and the area 48 defines a sector with angle β2, around the axis X1.

The geometry of the portion 44 of the mask 40 determines the geometry of the coating 20. In particular, the geometry of the slits 45 and 46 determines the coverage of the sectors 21 and 22 of the coating 20 formed on the land 12.

In the example of FIG. 6, the angles α1 and α2 each measure 156 degrees. Alternatively, the angles α1 and α2 can have different values, as a function of the desired coverage for the sectors 21 and 22.

Still in the example of FIG. 6, the angles α1 and α2 are identical, like the angles β1 and β2 are identical; nevertheless, it is possible to consider providing different angles to define different sectors 21 and 22.

Thus, the mask 40 makes it possible to isolate the parts of the piston 1 that it is not provided to coat, and to limit the deposition of coating 20 to the desired portions of the land 12 and the skirt 3.

The material of the mask 40 can be chosen according to the deposition technique of the coating 20. For example, the mask 40 can be made from steel or aluminum.

As a non-limiting example, the step for depositing the coating 20 can be carried out according to the teachings of document WO2012/156647.

Depending on the shape of the piston 1, the nature of the materials of the piston 1 and the sleeve C, and the nature of the contact, the piston 1/sleeve C friction represents 20 to 30% of the losses by engine friction.

Thus, the deposition of a coating on the skirt 2 and the land 12 can be leveraged in terms of decreasing friction, and therefore fuel consumption and $CO_2$ emissions.

On first approach, the new geometry of the pistons should lead to attributing between 5 and 10% of the losses by engine friction to the contact between the land 12 and the sleeve C. Under these conditions, the coating 20 applied on the land 12 should make it possible to decrease the losses by engine friction by about 2 to 5%.

Advantageously, the coating method of the piston 1 can include the following steps, considered alone or in combination.

Before the step for positioning of the mask 40, the method can include a step for preparing the surface of the second land 12, for example by machining or polishing.

Before the step for depositing the coating 20, generally before the step for positioning the mask 40, the method can include a step for washing the piston 1, and in particular washing the land 12 intended to receive the coating 20.

After the step for depositing the coating 20, the method can include a step for finishing the outer surface of the coating 20, for example by polishing.

Variants of masks 40 for manufacturing a piston 1 according to the invention are shown in FIGS. 7 to 10. For simplification reasons, the component elements of these masks 40 comparable to the mask 40 of FIGS. 5 and 6 bear the same numerical references, and only the differences are outlined hereinafter.

Figure 7:
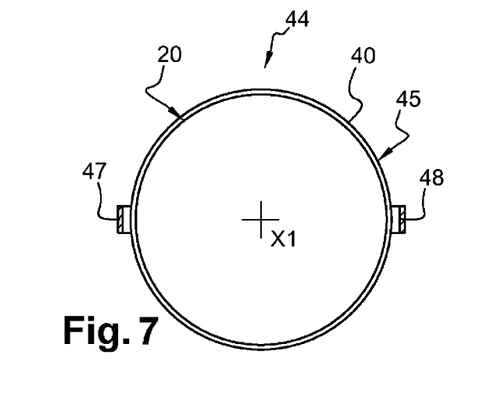
FIGS. 7, 8 and 9 are cross-sections similar to FIG. 6, showing mask variants.

In FIG. 7, the junction areas 47 and 48 are radially offset relative to the rest of the mask 40. Thus, the mask 40 includes a single slit making it possible to form the coating 20 on a sector with 360 degrees around the axis X1, like for the piston 1 of FIGS. 1 to 3.

Figure 8:
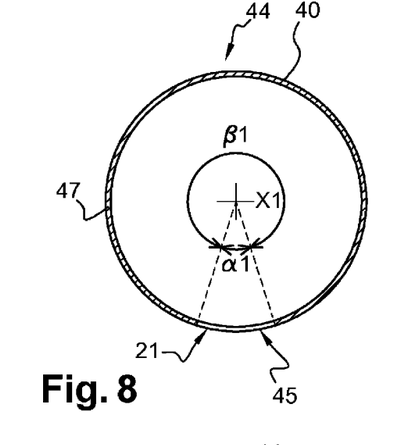

In FIG. 8, the mask 40 includes a single slit 45 having an angle α1 of 30 degrees. Thus, the mask 40 makes it possible to deposit the coating on a single radial sector 21 limited to 30 degrees.

Figure 9:
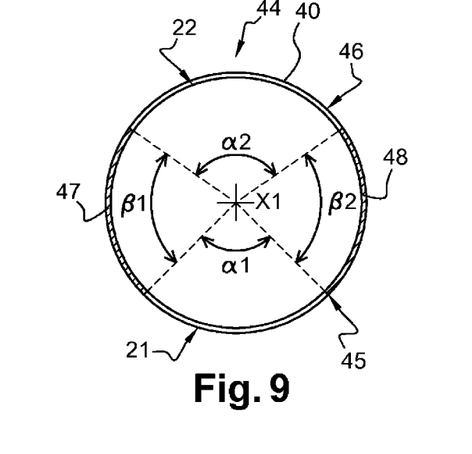

In FIG. 9, the angle α1 measures 90 degrees, while the angle α2 measures 110 degrees. The slits 45 and 46 have different geometries.

Figure 10:
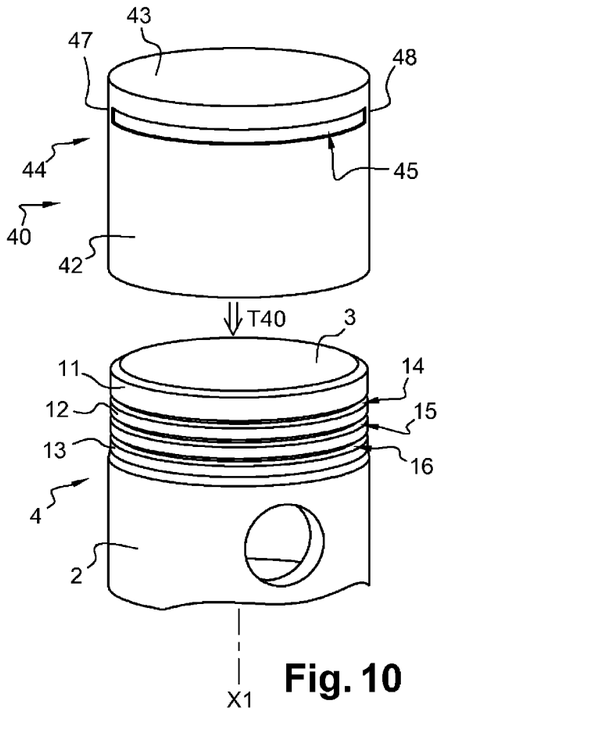
FIG. 10 is a view similar to FIG. 5, showing another mask variant.

In FIG. 10, the tubular part 42 is more elongated so as to cover the skirt 2. Thus, the skirt 2 can receive a different coating from the land 12, or lack any coating.

Alternatively, the tubular part 42 can be more or less elongated, and therefore cover a greater or lesser height of the skirt 2.

Other embodiments of a piston 1 according to the invention are shown in FIGS. 11 to 16. For simplification reasons, the constituent elements of the piston 1 comparable to those of the first embodiment described above bear the same numerical references, and only the differences are outlined hereinafter.

Figure 11:
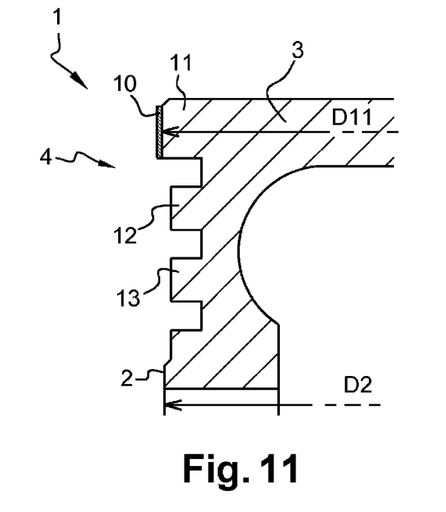
FIGS. 11 to 14 are partial cross-sections similar to FIG. 3, showing different piston variants.

In FIG. 11, the first land 11 is the contact land having a diameter D1l greater than the minimum diameter D2 of the skirt 2 and provided with a friction-reducing coating 10.

Figure 12:
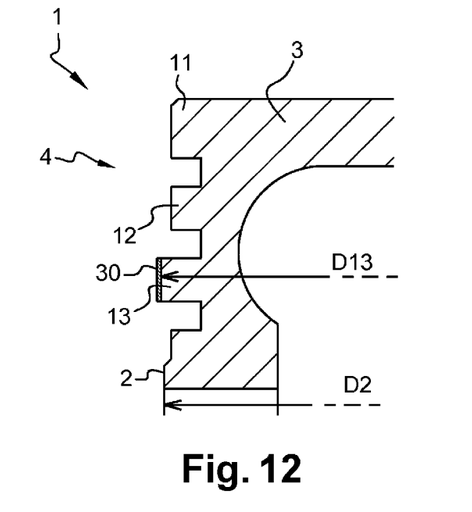

In FIG. 12, the third land 11 is the contact land having a diameter D13 greater than the minimum diameter D2 of the skirt 2 and provided with a friction-reducing coating 30.

Figure 13:
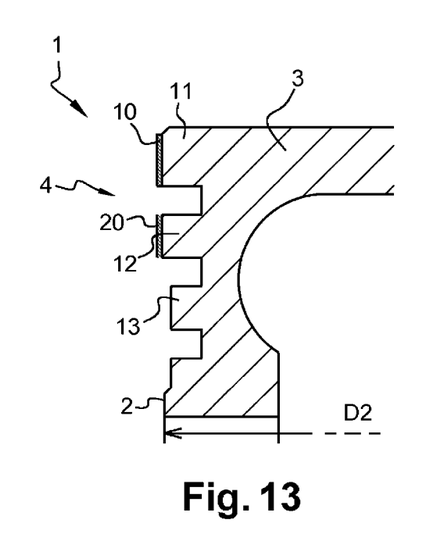

In FIG. 13, the first land 11 and the second land 12 are the contact lands having diameters D11 and D12 greater than the minimum diameter D2 of the skirt 2 and provided with friction-reducing coatings 10 and 20.

In this case, the mask 40 used during the deposition of the coatings 10 and 20 can include two superimposed portions 44, provided with slits 45 and 46. Alternatively, the coatings 10 and 20 can be deposited successively by using two different masks 40.

Preferably, the coating 10 is made from the same material as the coating 20.

Optionally, the land 11 can include at least one sublayer formed below the coating 10, like for the coating 20.

Figure 14:
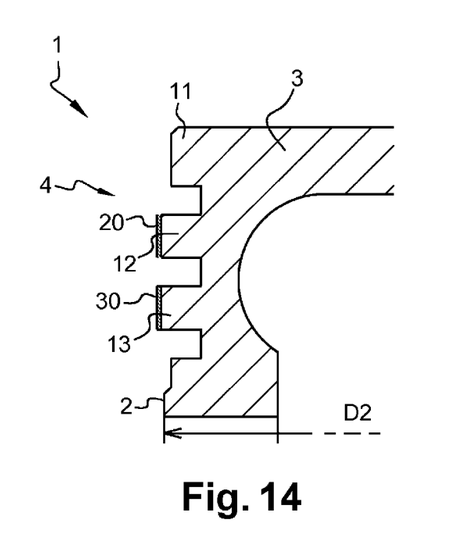

In FIG. 14, the second land 12 and the third land 13 are the contact lands having diameters D12 and D13 greater than the minimum diameter D2 of the skirt 2 and provided with friction-reducing coatings 20 and 30.

Figure 15:
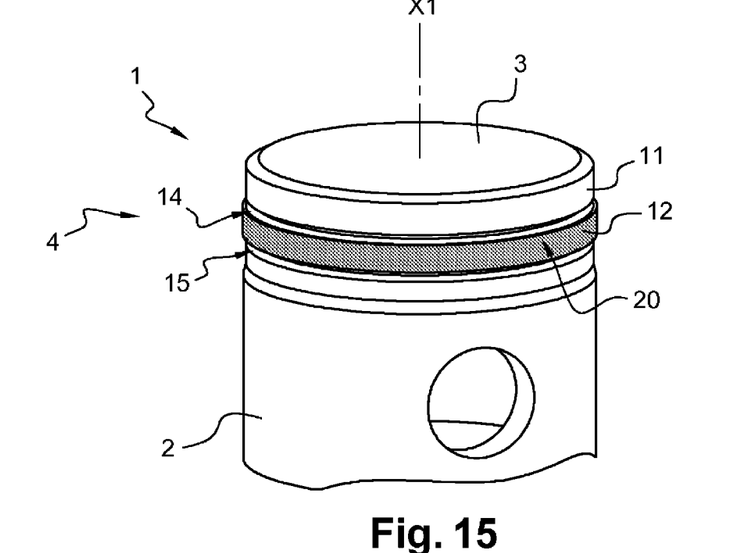
FIG. 15 is a perspective view similar to FIG. 2, showing a variant in which the ring carrier includes only two lands.

In FIG. 15, the ring carrier 4 includes only two lands 11 and 12, and no land 13. Only the second land 12 is provided with a friction-reducing coating 20. The ring carrier 4 receives a fire and sealing ring in the groove 14 and a scraping ring in the groove 15.

Figure 16:
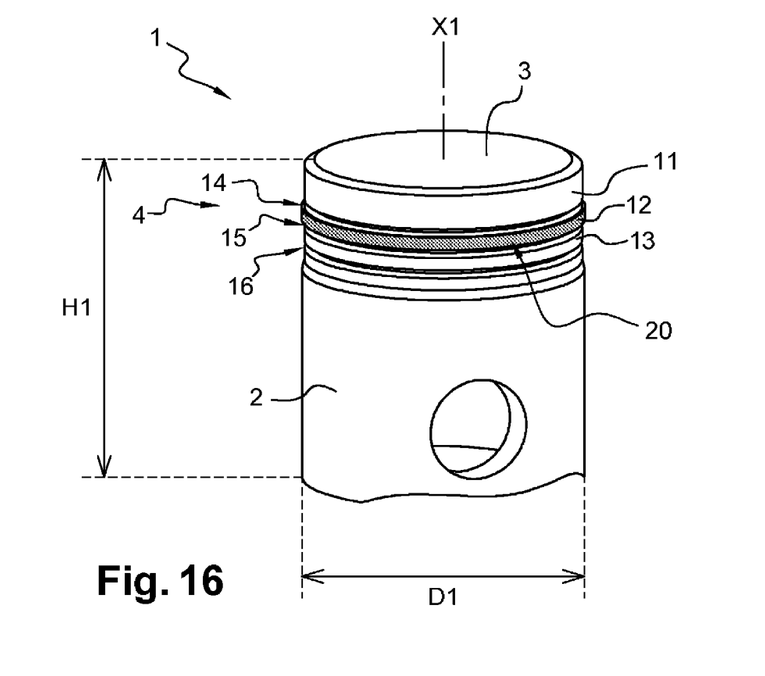
FIG. 16 is a view similar to FIG. 2, showing a variant in which the piston is of the long piston type.

In FIG. 16, the piston 1 is a long piston, having a height H1 larger than its diameter D1.

Alternatively, the piston 1 can have a height H1 equal to the diameter D1 without going beyond the scope of the invention.

Furthermore, the piston 1 and the mask 40 can be configured differently from FIGS. 1 to 16 without going beyond the scope of the invention. Moreover, the technical characteristics of the various embodiments and variants mentioned above can be, in whole or for some of them, combined with each other. Thus, the piston 1 can be adapted in terms of cost, functionalities and performance.

The invention claimed is:

1. A combustion engine piston, comprising:
    a skirt for guiding the piston in translation along a central axis in a counter-part and including a first contact area of the piston in the counter-part,
    a head which extends transverse to the central axis and is arrangeable to be in contact with the combustion gases, and
    a ring carrier which comprises at least two lands and at least two grooves for receiving rings, including a first land adjoining the head and a second land situated between the first land and the skirt,
    wherein the lands include at least one contact land having a diameter greater than a minimum diameter of the skirt to form a second contact area of the piston in the counter-part,
    wherein the at least one contact land comprises a friction-reducing surface coating formed at least on a radial sector covering an angle of at least 30 degrees, and up to on a single sector covering an angle of 360 degrees, and
    wherein the diameter of the contact land is considered without the coating, and the diameter of the skirt is considered without bore.

2. The piston according to claim 1, wherein at least one contact land has a diameter greater than an average diameter of the skirt.

3. The piston according to claim 1, wherein the piston is a short piston, having a diameter and a height smaller than the diameter.

4. The piston according to claim 1, wherein the base material of the piston is steel.

5. The piston according to claim 1, wherein the friction-reducing surface coating is made from DLC-type amorphous carbon a-C:H.

6. The piston according to claim 1, wherein the friction-reducing surface coating is made from DLC-type amorphous carbon ta-C.

7. The piston according to claim 1, wherein the at least one contact land includes at least one sublayer formed below the friction-reducing surface coating.

8. The piston according to claim 1, wherein the second land has a diameter larger than the first land.

9. The piston according to claim 1, wherein among the lands of the ring carrier, only the at least one contact land-include a friction-reducing surface coating.

10. The piston according to claim 1, wherein the ring carrier comprises a single contact land.

11. The piston according to claim 10, wherein in that the single contact land is the second land.

12. The piston according to claim 1, wherein the ring carrier comprises two contact lands.

13. The piston according to claim 12, wherein the two contact lands are the second land and a third land.

14. The piston according to claim 12, wherein the two contact lands are the first land and the second land.

15. A heat engine, comprising:
    a piston according to claim 1; and
    a counter-part receiving the piston.

16. The heat engine according to claim 15, wherein the counter-part includes a friction-reducing surface coating made from amorphous carbon of the DLC type.

17. A method for coating a piston according to claim 1, wherein the method comprises the following steps:
    a step for positioning a mask on the piston, and
    a step for localized deposition of a friction-reducing surface coating through the mask, at least on the at least one contact land.

18. A method for implementing a heat engine according to claim 15, wherein the skirt and the at least one contact land including the friction-reducing surface coating make up the contact areas of the piston in the counter-part.

* * * * *